March 23, 1948.   C. J. CLARKE   2,438,332
SOUNDING DEVICE
Filed Jan. 24, 1947    2 Sheets-Sheet 1

INVENTOR.
Charles J. Clarke
BY
Randolph & Beavers
Attys.

March 23, 1948.                C. J. CLARKE                2,438,332
                              SOUNDING DEVICE
                           Filed Jan. 24, 1947           2 Sheets-Sheet 2
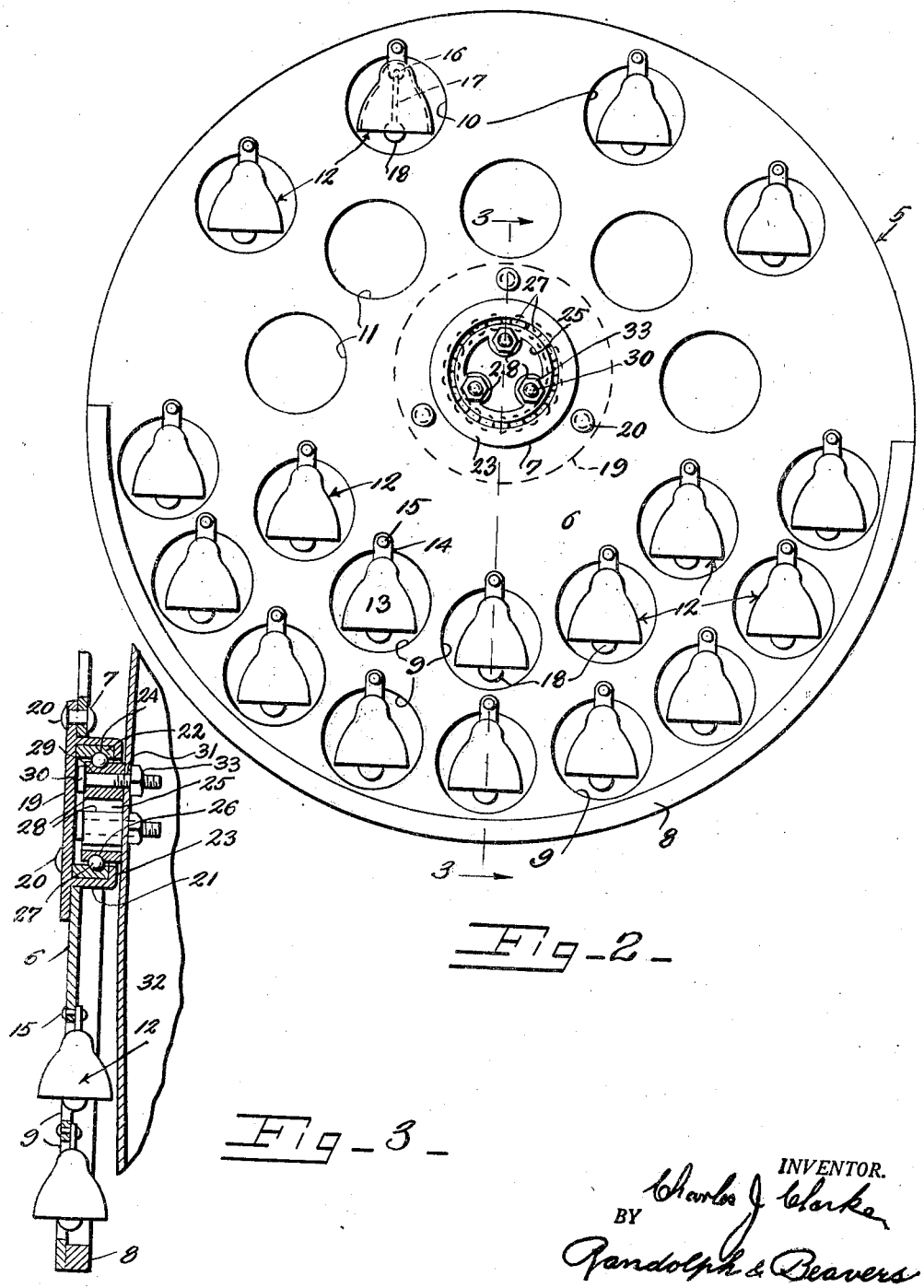
Fig-2-
Fig-3-
INVENTOR.
Charles J Clarke
BY
Randolph & Beavers
attys Patented Mar. 23, 1948

2,438,332

UNITED STATES PATENT OFFICE 2,438,332

SOUNDING DEVICE

Charles J. Clarke, Syracuse, N. Y.

Application January 24, 1947, Serial No. 724,093

5 Claims. (Cl. 116—37)

This invention relates to an attachment for rotatable elements and has particular reference to an attachment adapted to be applied to a vehicle hub cap and to be actuated in response to rotation of the hub cap for actuating audible means forming a part of said attachment.

More particularly, the present invention provides a device adapted to be operated similar to a pendulum for actuating audible means supported thereby and which are actuated in response to variations of speed of rotation of a hub cap or other rotatable elements on which the attachment is mounted and which will likewise be actuated or the actuation thereof effected in response to vibration of the hub cap or rotatable elements.

Various other objects and advantages of the invention will hereinafter become more fully apparent from the following description of the drawings, illustrating a preferred embodiment thereof, and wherein—

Figure 2 is a similar view of the opposite, inner or rear side thereof, and

Figure 3 is a sectional view taken substantially along a plane as indicated by the line 3—3 of Figure 2, but showing the device attached to a portion of a hub cap or rotatable element.

Figure 1:
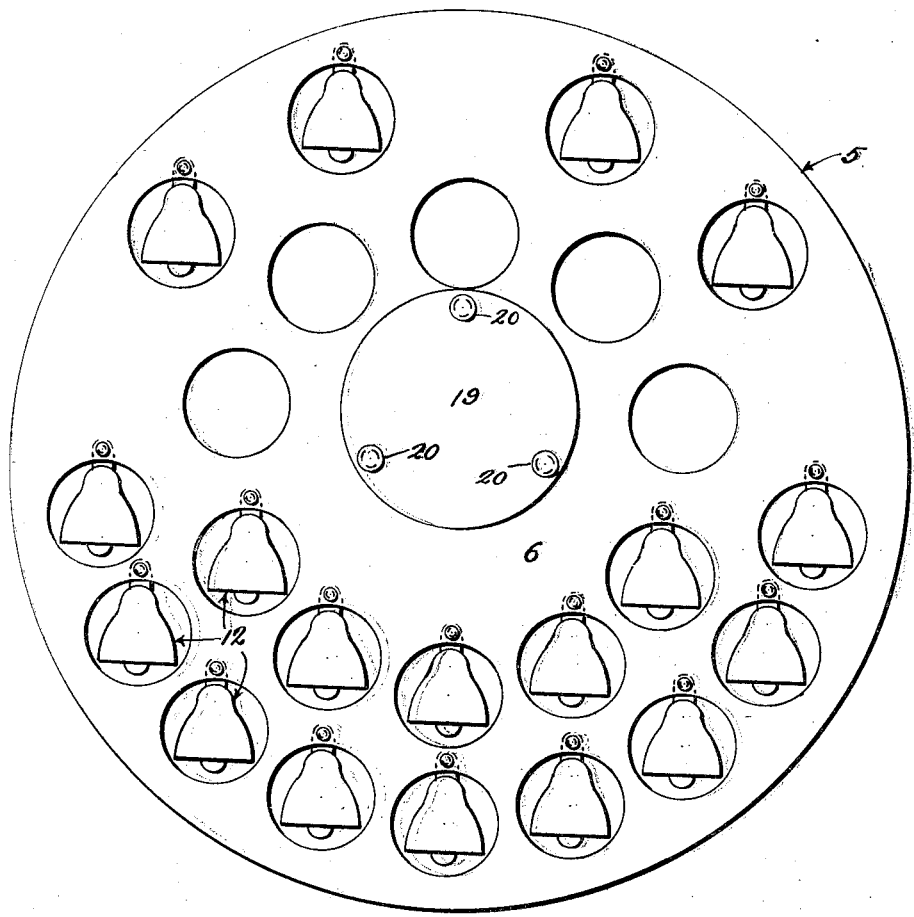
Figure 1 is a front elevational view of a preferred embodiment of the audible device.

Referring more specifically to the drawings, the audible device in its entirety is designated generally 5 and includes a disk 6, which may be formed of any suitable material, such as steel, fiber or plastic and which is provided with an opening 7 therein, which is eccentrically disposed. As seen in Figure 2, the inner or rear face of the disk 6 has an arcuate weighted strip or bar 8 suitably fixed thereto, adjacent the periphery of the disk 6 and extending approximately through an arc of 180 degrees.

The opening 7 is disposed remote to the strip 8, as seen in Figure 2, and the disk 6 is provided with two substantially concentrically disposed arcuate rows of openings 9, which are formed therein, adjacent to and substantially concentric with the strip 8. The disk 6 is also provided with a plurality of arcuately spaced openings 10, located adjacent a portion of the periphery thereof and remote to the openings 9, and said disk 6 is provided with a series of openings 11 forming a circle with the inner row of openings 9 and which are disposed eccentrically of the opening 7.

An audible indicator, preferably in the form of a bell, designated generally 12 is mounted in each of the openings 9 and 10, each of said bells 12 including a body 13 having a bar 14 extending through its upper restricted end and rigidly fixed therein. The outer, exposed end of each bar 14 overlies a portion of the rear face of the disk 6 and is secured thereto by a rivet 15 and the opposite, inner end of each bar 14, as illustrated in dotted lines in Figure 2, is provided with an opening 16 to pivotally receive and pivotally support the hanger 17 of a tongue or clapper 18, which is thereby swingably suspended in the bell body 13. The bars 14 support the bell bodies 13 within the openings 9 and 10 and out of contact with the disk 6 and said bars 14 are arranged substantially parallel and so that the hangers 17 of the clappers 18 will normally depend in a direction toward the strip 8.

A plate or cap 19 is secured by fastenings, such as rivets 20 to the forward or outer side of the disk 6 and is provided with an annular flange 21 which extends through the opening 7 thereof and which substantially fills said opening. The flange 21 contains a relatively wide ring 22 which is retained therein by the inturned edge 23 of said flange 21 and which is provided with an annular inwardly opening groove 24. A ring or collar 25 is disposed loosely within the flange 21 and its ring 22 and is provided with an external annular groove 26 which is adapted to align with the groove 24 to combine therewith to form a retaining means for a plurality of ball bearings 27 which are disposed therein and by means of which the collar 25 is rotatably supported within and substantially concentric of the ring 22. The ring 22 and collar 25 combine to form the outer and inner races of the anti-friction ball bearing mounting which also includes the bearings 27.

The collar 25 is provided with a plurality of internal enlargements 28, as seen in Figure 3, each having a bore 29 extending therethrough for receiving the shank of a bolt 30. The headed end of each bolt 30 is mounted within the flange 21, and the threaded opposite end of said bolts project from the exposed side of the collar 25 and are adapted to extend through openings 31 in the center of a rotatable member 32, such as a hub cap and are detachably retained therein by nuts 33 which engage said threaded ends for clamping a portion of the rotatable member or hub cap 32 against the collar 25. As seen in Figure 3, the collar 25 projects outwardly beyond the flange lip or inturned portion 23 so that the rotatable member or hub cap 32 is spaced therefrom when clamped to the collar 25.

The ball bearing races are preferably formed of aluminum, steel or magnesium or other material which will be light in weight and wear resistant and the ball bearings 27 are preferably formed of steel. The bells 12 are preferably formed of brass or other bell metal which is rust resistant.

Figure 1 illustrates the audible device as it would appear looking toward the outer side thereof and in substantially the position that it will normally assume when applied to a rotatable element such as the hub cap 32, due to the fact that the parts supported by the cap or plate 19 are eccentrically disposed and the weighted strip 8 and the preponderance of the bell 12 are located contiguous with the portion of the disk 6 having its periphery located remote to the plate 19. It will be readily apparent that the predominant number of the bells 12 are located adjacent the weighted bar strip 8 and the bells 12 located in the openings 10 will obviously be of insufficient weight to overbalance the weight of the bells contained in the openings 9 augmented by the weight of the strip 8. Furthermore, the unoccupied openings 11 tend to lighten the portion of the disk 6 provided with the openings 10.

The audible device 5 is intended to be applied to a hub cap of the front wheel of a vehicle and it will be readily apparent that such a device 5 may be applied to each of the hub caps of the front wheels so that when the vehicle is in operation variations in speed in the rotation of the hub caps 32, to which the devices 5 are applied, will cause the disks 6 to swing in pendulum fashion thereby to oscillate the clappers 18 which will strike the bell bodies 13 for producing a sound or sounds depending upon the tone of the bells 12.

Obviously, various other types of audible indicators may be substituted for the bells 12, such as conventional cast jingle-bells which may be mounted in the same manner as the bells 12 for functioning in the same manner and for the same purpose. Likewise, roller bearings could be substituted for the ball bearings 27 by varying the shape of the grooves 24 and 26 and various other modifications and changes are likewise contemplated and may obviously be resorted to, without departing from the spirit and scope of the invention as hereinafter defined by the appended claims.

I claim as my invention:

1. In an audible device of the character described, a body member, mounting means for rotatably supporting said body member on a rotating element having translational motion varying proportionately to the speed of rotation of said element, means carried by said body member for preventing the rotation thereof with the rotating element and whereby said body member will be caused to oscillate in response to variations in the translational motion of the rotating element, and audible means carried by said body member and constructed and arranged to be actuated by the oscillation thereof.

2. A device as in claim 1, said body member comprising a disk, and said mounting means being eccentrically connected thereto.

3. An audible device as in claim 1, said body member comprising a disk having a plurality of openings formed therein, said audible means comprising a plurality of bells mounted in certain of said openings and including bell body portions or vessels fixedly disposed within said openings and containing swingably mounted clappers, and the predominance of said bells being disposed contiguous with a portion of the periphery of said body member located remote to said mounting means.

4. In an audible device of the character described, a body member, mounting means for rotatably supporting said body member on a rotating element having translational motion varying proportionately to the speed of rotation of said element, and audible means carried by said body member and constructed and arranged to be actuated by the oscillation thereof, said body member comprising a disk having an arcuate weighted bar secured around a portion thereof and adjacent a part of the periphery of the disk and remote to said mounting means whereby the body member will oscillate in response to variations in the translational motion of the rotating element, and said audible means including a plurality of bells, the majority of said bells being disposed on said disk and adjacent to said weighted bar.

5. In an audible device of the character described, a body member, mounting means for rotatably supporting said body member on a rotating element having translational motion varying proportionately to the speed of rotation of said element, means carried by said body member for preventing the rotation thereof with the rotating element and whereby said body member will be caused to oscillate in response to variations in the translational motion of the rotating element, and audible means carried by said body member and constructed and arranged to be actuated by the oscillation thereof, said body member comprising a disk having an eccentric opening therein, said mounting means including a plate secured to one side of said disk and over said opening and having an annular flange extending therethrough and ball bearing means supported in said flange and including an inner race rotatably mounted relatively to the flange and detachably connected to said rotatable element.

CHARLES J. CLARKE.

REFERENCES CITED

The following references are of record in the file of this patent:

UNITED STATES PATENTS

| Number | Name | Date |
| --- | --- | --- |
| 801,062 | Clark | Oct. 3, 1905 |
| 1,317,072 | Carlier | Sept. 23, 1919 |
| 1,904,028 | Kersten | Apr. 18, 1933 |
| 2,138,648 | Stankey | Nov. 29, 1938 |
| 2,175,938 | Fry | Oct. 10, 1939 |
| 2,274,156 | Nielsen et al. | Feb. 24, 1942 |